| United States Patent [19] | [11] | 4,238,350 |
|---|---|---|
| Larsen et al. | [45] | Dec. 9, 1980 |

[54] METHOD AND A COMPOSITION FOR INHIBITING CORROSION

[75] Inventors: Arthur L. Larsen, Saltsjöbaden; Sören J. Marklund, Saltsjö-Boo; Jan Rosenblom, Saltsjöbaden, all of Sweden

[73] Assignee: Malaco AG, Zug, Switzerland

[21] Appl. No.: 959,083

[22] Filed: Nov. 9, 1978

[30] Foreign Application Priority Data

Nov. 16, 1977 [SE] Sweden .............................. 7712953
Nov. 16, 1977 [SE] Sweden .............................. 7712957

[51] Int. Cl.$^3$ ...................... C23F 11/14; C23F 11/12; E21B 43/22
[52] U.S. Cl. .................... 252/392; 106/14.13; 106/14.18; 106/14.42; 106/14.43; 252/8.55 D; 252/8.55 E; 252/394; 422/12
[58] Field of Search ............... 252/392, 391, 8.55 D, 252/8.55 E, 394; 422/12; 106/14.13, 14.18, 14.42, 14.43

[56] References Cited

U.S. PATENT DOCUMENTS

| 3,119,447 | 1/1964 | Raifsnider et al. ............ 252/8.55 D |
| 3,121,091 | 2/1964 | Green .................................. 252/391 |
| 3,629,104 | 12/1971 | Maddox .......................... 252/8.55 E |
| 3,645,896 | 2/1972 | Larsen ............................ 252/8.55 E |
| 3,712,863 | 1/1973 | Bundrant et al. ............... 252/8.55 E |
| 3,770,055 | 11/1973 | Larsen ............................ 252/8.55 E |
| 3,976,593 | 8/1976 | Hartke ................................ 252/391 |

Primary Examiner—Benjamin R. Padgett
Assistant Examiner—Irwin Gluck
Attorney, Agent, or Firm—Fred Philpitt

[57] ABSTRACT

Corrosion of metals in contact with liquid systems is reduced by adding to the system a small amount of an amino carboxylic acid containing at least one hydrophobic group in combination with another nitrogen containing compound. The other compound is preferably an ether amine or a quaternary ammonium compound which also contain hydrophobic groups. The combination of substances is particularly useful for preventing corrosion in different areas of oil recovery and in petroleum industry.

10 Claims, No Drawings

METHOD AND A COMPOSITION FOR INHIBITING CORROSION

The present invention relates to a method of treating corrosive systems to prevent corrosion of metals in contact with the systems and more particularly it pertains to a method of preventing corrosion by utilization of amino carboxylic acids in combination with certain other nitrogen containing compounds. The invention also relates to compositions for inhibiting corrosion.

In order to preserve metals, and particularly ferrous metals, in contact with corrosive liquids corrosion inhibitors are added to many systems including cooling systems, refinery units, pipelines, steam generators, oil production units etc.

Nitrogen compounds such as quaternary ammonium compounds, amines, fatty amine salts, sarcosine derivatives, amino carboxylic acids etc are known corrosion inhibitors. These compounds are film-forming inhibitors, i.e. they are adsorbed on metal surfaces forming a protective film between the metal and the corrosive environment. Film-forming inhibitors of the mentioned kind are useful against corrosion arising from inorganic salts such as chlorides, sulfates, carbonates etc, dissolved gases such as carbon dioxide and hydrogen sulfide. Conventional nitrogen containing inhibitors do however often fail in systems containing certain combinations of dissolved gases such as hydrogen sulfide and oxygen. These gases are important corrosion factors in liquid systems, especially in the petroleum industry, and the cause of serious localized corrosion at certain conditions. Prevention of oxygen corrosion is usually effected by utilization of separate oxygen scavengers, the most common ones being hydrazine, sulfite and dithionite.

According to the present invention it has been found that a substantial reduction of corrosion of metal structures, such as ferrous pipes, tubings etc, is obtained by the utilization of amino carboxylic acids containing at least one organic hydrophobic group in combination with an amine, an ether amine, a quaternary ammonium compound or a cyclic nitrogen containing compound. The active substances can be introduced into aqueous systems such as cooling systems, systems for hydrostatic testing, water flooding systems in oil recovery etc, and into organic systems, particularly hydrocarbon systems, such as pipelines and transmission lines, refinery units and chemical processing systems.

The present invention thus relates to a method for preventing corrosion of metals in contact with liquid systems which comprises adding to the systems an effective amount of an amino carboxylic acid having the general formula

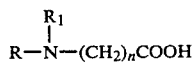

wherein R is an organic hydrophobic group having 6 to 22 carbon atoms, $R_1$ is hydrogen, a lower alkyl group or has the same meaning as R and n is an integer from 1 to 10 in combination with a nitrogen containing compound selected form the groups
(a) mono-, di- or polyamines
(b) ether mono-, di- or triamines
(c) quaternary ammonium compounds
whereby the compounds of the groups (a), (b) and (c) contain at least one organic hydrophobic group having 6 carbon atoms or more, or
(d) a cyclic nitrogen containing compound such as morpholine, cyclohexylamine and imidazolines.

In the amino carboxylic acid the hydrophobic group R may optionally contain substituents that do not adversely affect the anti-corrosive properties of the compound. As examples of such inert, non-interfering substituents can be mentioned ether- and ester groups. The group R is suitably a straight or branched aliphatic hydrocarbon group having 6 to 22 carbon atoms, preferably 8 to 18 carbon atoms. $R_1$ is suitably hydrogen or has the same meaning as R and n is suitably an integer from 1 to 5.

As examples of suitable hydrophobic groups R can be mentioned alkyl groups, such as octyl, decyl, dodecyl, hexadecyl and octadecyl groups, alkenyl groups, such as oleyl and linoleyl. The groups may of course also be mixtures of naturally occuring groups. Examples of some suitable amino carboxylic acids are dodecyl aminocaproic acid, dodecyl amino acetic acid, tetradecyl aminopropionic acid, dioctyl aminopropionic acid, dodecyl aminopropionic acid.

The mono-, di- or polyamines for use in combination with the amino carboxylic acids contain at least one organic hydrophobic group having 6 carbon atoms or more. These amines, wherein the nitrogen atoms can be primary, secondary or tertiary, may as further substituents contain hydroxyalkyl groups or may be alkoxylated, e.g. with ethylene- or propyleneoxide. They may also contain amido groups in the hydrocarbon chain.

When the amino carboxylic acids are used together with the compounds morpholine or cyclohexylamine these are preferably unsubstituted. Imidazolines comprise compounds having the formula

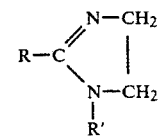

wherein R is an organic hydrophobic group having at least 8 carbon atoms and R' is $-(C_2H_4-NH)_nH$ where n is 1 to 4.

Preferably the amino carboxylic acids are used in combination with ether amines or quaternary ammonium compounds.

The quaternary ammonium compounds for use in combination with the acids can be represented by the general formula

wherein at least one of the groups R is an organic hydrophobic group having 6 or more carbon atoms and suitably an alkyl group having 8 to 20 carbon atoms. The other substituents are independently alkyl or hydroxyalkyl groups having 1 to 4 carbon atoms, benzyl groups or alkoxy groups of the formula $(CH_2H_4O)_pH$ or $(C_3H_6O)_pH$ where p is 2 to 10. The preferred anion in the quaternary ammonium compounds is chloride but this can of course be replaced by any other anion such as bromide ion, ethylsulfate ion etc. As examples of suitable quaternary ammonium compounds can be mentioned dioctyl dimethyl ammonium chloride, dodecyl trimethyl ammonium chloride, cetyl trimethyl ammonium chloride, cetyl trimethyl ammonium bromide, dodecyl dimethyl benzyl ammonium chloride etc. Particularly good results have been obtained with quaternary ammonium compounds containing one organic hydrophobic group and one benzyl group, the other substituents being hydroxyalkyl or alkyl groups having 1 to 4 carbon atoms.

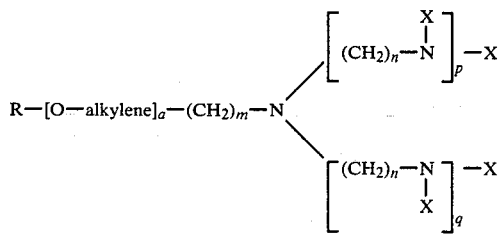

wherein R is an organic hydrophobic group containing at least 6 carbon atoms, a is an integer between 1 and 5, m an integer of 0 or 1, n an integer between 2 and 10, the groups X independent of each other are hydrogen, an alkyl group having 1 to 4 carbon atoms or the group (alkylene-O)$_y$H where y is 1 to 10, p is 0, 1 or 2 and q is 0 or 1, whereby however q is 0 when p is 2, and the alkylene group is an ethylene-, propylene- or isopropylene group.

The ether amines may be used as free amines or in the form of water soluble salts such as chlorides, hydrochlorides, phosphates, sulfites, bisulfites, acetates, benzoates etc. They are preferably used as free amines or as sulfites or bisulfites.

Particularly preferred are the ether amines which can be represented by the general formula

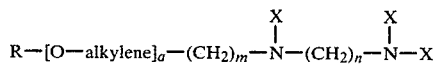

where the substituents and integers have above given meaning.

The organic hydrophobic group is suitably a straight or branched aliphatic hydrocarbon group containing 6 to 22 carbon atoms, preferably 8 to 18 carbon atoms and most preferably 8 to 12 carbon atoms. As example of suitable groups can be mentioned alkyl groups such as heptyl, octyl, nonyl, decyl, dodecyl, hexadecyl, octadecyl, 2-ethylhexyl, 2-ethyl-4-methylpentyl, isononyl, isodecyl, isotridecyl, isohexadecyl, iso-octadecyl, alkenyl groups such as oleyl and linoleyl. The organic hydrophobic groups may also be mixtures of naturally occuring groups.

In the groups (O-alkylene) it is understood that they can contain mixture of ethylene, propylene and isopropylene groups.

The substitutent X in the ether amines suitably represents hydrogen or alkoxy groups where y is 1 to 10, preferably X is hydrogen. The integer a is preferably 1 or 2 and m is preferably 0 when a is 1 and 0 or 1 when a is greater than 1. The integer n is preferably 2 or 3.

Examples of suitable ether amines are 3-octoxypropyl amine, N(3-octoxypropyl) propylene diamine, N(3-decoxypropyl) propylene diamine, N(3-dodecoxypropyl) propylene diamine, N(2-octoxyethyl) ethylene diamine, N(2-decoxyethyl) ethylene diamine.

In the method of the invention the amino carboxylic acid is suitably used in combination with the selected other compound or compounds in a mole ratio from 1:20 to 20:1, preferably in a mole ratio of 1:5 to 5:1.

Combinations of amino carboxylic acids and ether amines are preferably used in the method. Besides the particularly good corrosion inhibiting effect of the combination, the ether amines have advantageous miscibility and solubility properties in water systems and they also have useful bactericidal properties.

In a particular embodiment of the present invention the amino carboxylic acids are used in combination with sulfites or bisulfites of the ether amines. The sulfites of the ether amines have good reducing properties and thus give excellent protection against pitting corrosion. These compounds can be prepared by reacting sulfur dioxide or sulfurous acid with the ether amines in water, alcohols or mixtures of these at room temperature or slightly elevated temperatures. Hereby the ether amine can be reacted with one mole or less of $SO_2$ or $H_2SO_3$ per nitrogen atom in the ether amine.

The amino carboxylic acid and the other nitrogen containing compound can be added to a corrosive system in the form of solutions or dispersions in water and/or organic solvent. As examples of solvents can be mentioned lower alcohols such as methanol, ethanol and isopropylalcohol, glycols and aliphatic and aromatic hydrocarbons. Mixing of the compounds in the diluent can be carried out at room temperature or slightly elevated temperatures. At mixing with amines, salts between these and the amino carboxylic acid may be formed to some extent.

It is within the scope of the invention that the present combinations can be used together with other corrosion inhibitors and additives. A particularly preferred substance for use with the present combinations is hydrazine. Hydrazine can e.g. be present in molar equivalents with respect to the amino carboxylic acid or in slight molar excess.

The invention also relates to a composition for preventing corrosion of metals, said composition comprising the above defined amino carboxylic acids, or alkali metal salts thereof, in combinations with the above defined amines, ether amines, quaternary ammonium compounds or cyclic nitrogen containing compounds. The mole ratio of the amino carboxylic acid to the other active compound is suitably within the range of from 1:20 to 20:1, preferably within the range of 1:5 to 5:1. The composition may in addition contain hydrazine. The most preferred compositions are those comprising the amino carboxylic acid and the ether diamines or sulfites thereof.

The amount of active ingredients in the compositions required for sufficient protection does of course vary with the corrosiveness of the systems. Methods for monitoring the severity of corrosion in different systems are well-known and serve as a basis for deciding the effective amount.

The amino carboxylic acids together with the selected other compound generally give a substantial reduction of corrosion when present in amounts of about 1 ppm based on the weight of the corrosive liquid. The upper limit is not critical but depends on the particular compound and the particular system. Amounts up to and above 1000 ppm can be used but preferably the concentration is within the range of 1 to 200 ppm.

The compositions according to the invention are particularly useful in the different areas of oil recovery and petroleum industry. They can be used in primary, secondary and tertiary oil recovery and be added in a manner known per se. They can also be incorporated in water-soluble capsules which are introduced in the wells and when the capsules dissolve the inhibitor is slowly released into the corrosive fluid. Another technique in primary oil recovery where they can be used is the squeeze treating technique, whereby they are injected under pressure into the producing formation, are adsorbed on the strata and desorbed as the fluids are produced. They can further be added in the water flooding operations of secondary oil recovery as well as be added to pipelines, transmission lines and refinery units.

The compositions of the invention can be used in combination with known inhibitors and oxygen scavengers and also in combination with additives generally used in the field such as anti-freezing agents, anti-fouling agents, surface active agents, e.g. nonionic dispersants and chelating agents.

The invention is further illustrated in the following examples which however are not intended to limit the same.

EXAMPLE 1

Dodecylaminopropionic acid and N-(3-octoxypropyl)-propylene diamine were mixed in molar ratio 1:1. 30 grams of the mixture was diluted in 35 grams of isopropanol and 35 grams of water to give a clear liquid solution.

EXAMPLE 2

Dodecylaminopropionic acid, hydrazine and dodecyl dimethyl benzyl ammonium chlorid was mixed in molar ratio 1:1:0,3. 30 grams of the mixture were diluted in 50 grams of isopropanol and 20 grams of water to give a clear solution, stable at room temperature.

EXAMPLE 3

Corrosion test

The products from example 1 and 2 and several other products were tested. All formulations were made up in isopropanol and water as solvent. The dosage in ppm is referring to the active part of the inhibitor, i.e. not the solvent.

Test method 50 ml of crude oil and 950 ml of a brine solution with the following composition was poured into a 1000 ml E-flask

| component | % |
|---|---|
| NaCl | 4.4 |
| NaHCO$_3$ | 0.08 |
| CaCl$_2$ | 0.06 |
| MgCl$_2$ | 0.03 |
| MgSO$_4$ | 0.01 |
| water | 95.43 |

The mixture was vigorously stirred and CO$_2$ was bubbled through for 15 minutes giving a mixture saturated on CO$_2$ and with an oxygen content less than 0.5 ppm. The temperature was kept at 25° C. A polarisation resistance instrument (Magna Corrater) equipped with 1010 mild steel electrodes was used for the corrosion measurements. After the end of the period of 15 minutes, the electrodes were put into the brine solution. After 1 hour of stabilization of the corrosion rate a corrosion reading ($C_A$) was taken, then the inhibitor was added. After further 6 hours a final corrosion reading was taken ($C_B$). During the test a CO$_2$-saturated brine was obtained by continued injection of CO$_2$ into the solution.

Since different electrodes give different initial corrosion readings, a relative corrosion rate at the end of the test period was calculated Relative corrosion rate $= (C_B/C_A) \times 100$ In the table the following abbreviations have been used.
Dodecylaminopropionic acid: DAP
Oleylaminopropionic acid: OAP
Dodecyldimethylbenzyl-ammoniumchloride: DBA
N-(3-octoxypropyl) propylenediamine: OPD

| INHIBITOR | MOLE RATIO | DOSAGE ppm | RELATIVE CORROSION RATE |
|---|---|---|---|
| 0 | — | — | 100 |
| DAP | — | 5 | 25 |
| OAP | — | 5 | 20 |
| DBA | — | 5 | 40 |
| DAP - DBA | 10:1 | 5 | 0.8 |
| Octylamine | — | 5 | 80 |
| DAP - Octylamine | 1:1 | 5 | 10 |
| OPD | — | 5 | 80 |
| DAP - OPD | 3:1 | 5 | 1.0 |
| DAP - OPD | 1:1 | 5 | 1.0 |
| Morpholine | — | 5 | 100 |
| DAP - morpholine | 5:1 | 5 | 10 |
| Cyclohexylamine | — | 5 | 100 |
| DAP - cyclohexylamine | 5:1 | 5 | 6 |
| DAP - DBA - hydrazine | 1:0.3:1 | 5 | 0.4 |

We claim:

1. A method of preventing corrosion of metals in contact with liquid systems, characterized in that, to the systems is added an effective amount of an amino carboxylic acid having the general formula $$R-N(R_1)-(CH_2)_n COOH$$

wherein R is an organic hydrophobic group having 6 to 22 carbon atoms, R$_1$ is hydrogen, an alkyl group having 1 to 4 carbon atoms or has the same meaning as R and n is an integer from 1 to 10, in combination with a nitrogen containing compound selected from the groups
   (a) mono-, di- or polyamines
   (b) ether mono-, di- or triamines,
   (c) quaternary ammonium compounds,
whereby the compounds of the groups (a), (b) and (c) contain at least one organic hydrophobic group having 6 carbon atoms or more, or
   (d) a cyclic nitrogen containing compound being morpholine, cyclphexylamine or imidazolines.

2. A method according to claim 1, characterized in that, the substituent R is a straight or branched aliphatic group having 8 to 18 carbon atoms, R$_1$ is hydrogen or has the same meaning as R and n is 1 to 5.

3. A method according to claim 1 or 2, characterized in that, the amino carboxylic acid is used in combination with a quaternary ammonium compound having the general formula

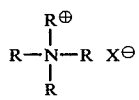

wherein at least one of the groups R is an organic hydrophobic group having 6 carbon atoms or more and the other substituents independently are alkyl or hydroxylalkol groups having 1 to 4 carbon atoms, benzyl groups or alkoxy groups of the formula $(C_2H_4O)_pH$ or $(C_3H_6O)_pH$ where p is 2 to 10 and X is an anion.

4. A method according to claim 1 or 2, characterized in that, the amino carboxylic acid is used in combination with an ether amine having the general formula

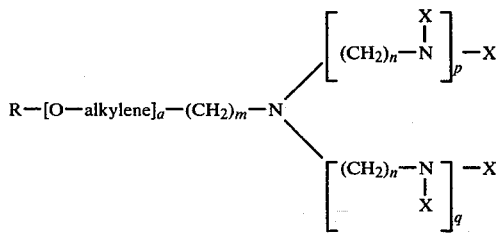

wherein R is an organic hydrophobic group containing at least 6 carbon atoms, a is an integer between 1 and 5, m an integer of 0 or 1, n an integer between 2 and 10, the groups X independent of each other are hydrogen, an alkyl group having 1 to 4 carbon atoms or the group (alkylene-O)$_y$H where y is 1 to 10, p is 0,1 or 2 and q is 0 or 1, whereby however q is 0 when p is 2, and the alkylene group is an ethylene-, propylene- or isopropylene group.

5. A method according to claim 4, characterized in that, the ether amine is used in the form of a sulfite or a bisulfite.

6. A method according to claims 1 or 2, characterized in that, the mole ratio of amino carboxylic acid to nitrogen containing compound is within the range of from 1:20 to 20:1.

7. A method according to claims 1 or 2, characterized in that, in addition to the combination hydrazine is added.

8. A composition for preventing corrosion of metals in contact with liquid systems, characterized in that, it comprises an amino carboxylic acid having the general formula

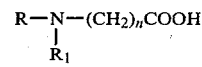

wherein R is an organic hydrophobic group having 6 to 22 carbon atoms, $R_1$ is hydrogen, an alkyl group having 1 to 4 carbon atoms or has the same same meaning as R and n is an integer from 1 to 10, or alkali metal salt thereof, in combination with a nitrogen containing compound selected from the groups (a) mono-, di- or polyamines
(b) ether mono-, di- or triamines,
(c) quaternary ammonium compounds, whereby the compounds of the groups (a), (b) and (c) contain at least one organic hydrophobic group having 6 carbon atoms or more, or (d) a cyclic nitrogen containing compound being morpholine, cyclohexylamine or imidazonlines, whereby the mole ratio of amino carboxylic acid to the nitrogen containing compound is within the range of from 1:20 to 20:1.

9. A composition according to claim 8, characterized in that, the nitrogen containing compound is a quaternary ammonium compound having the general formula

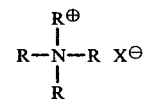

wherein at least one of the groups R is an organic hydrophobic group having 6 carbon atoms or more and the other substituents independently are alkyl or hydroxylalkol groups having 1 to 4 carbon atoms, benzyl groups or alkoxy groups of the formula $(C_2H_4O)_pH$ or $(C_3H_6O)_pH$ where p is 2 to 10 and X is an anion.

10. A composition according to claim 8, characterized in that, the nitrogen containing compound is an ether amine having the general formula

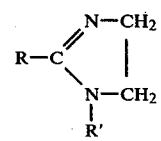

wherein R is an organic hydrophobic group containing at least 6 carbon atoms, a is an integer between 1 and 5, m an integer of 0 or 1, n an integer between 2 and 10, the groups X independent of each other are hydrogen, an alkyl group having 1 to 4 carbon atoms or the group (alkylene-O)$_y$H where y is 1 to 10, p is 0,1 or 2 and q is 0 or 1, whereby however q is 0 when p is 2, and the alkylene group is an ethylene-, propylene- or isopropylene group.

* * * * *